Figure 4:
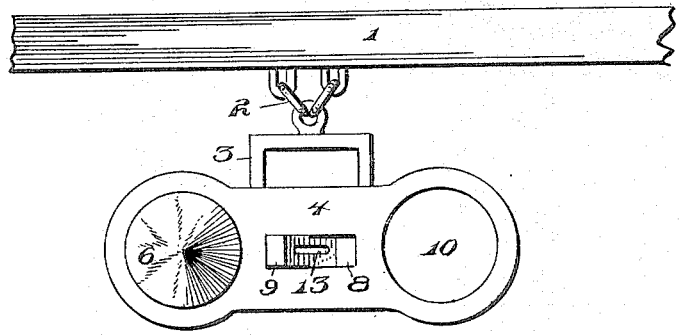

No. 640,405. Patented Jan. 2, 1900.
G. J. NETTER.
AUTOMATIC COUPLING FOR AIR BRAKES.
(Application filed Nov. 6, 1899.)
(No Model.) 2 Sheets—Sheet 1.
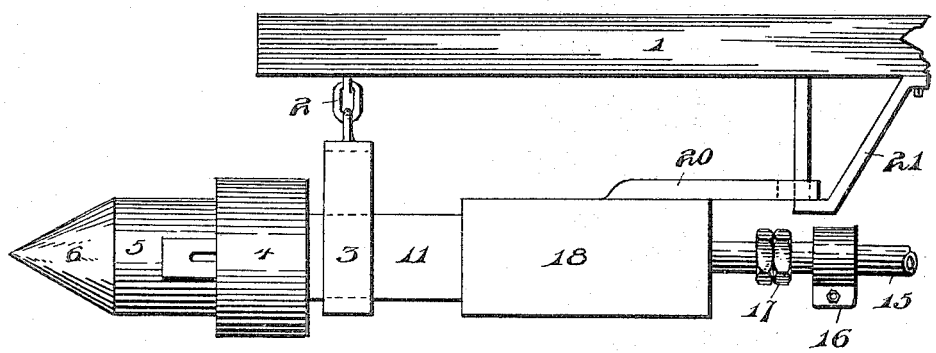
Fig. 1.
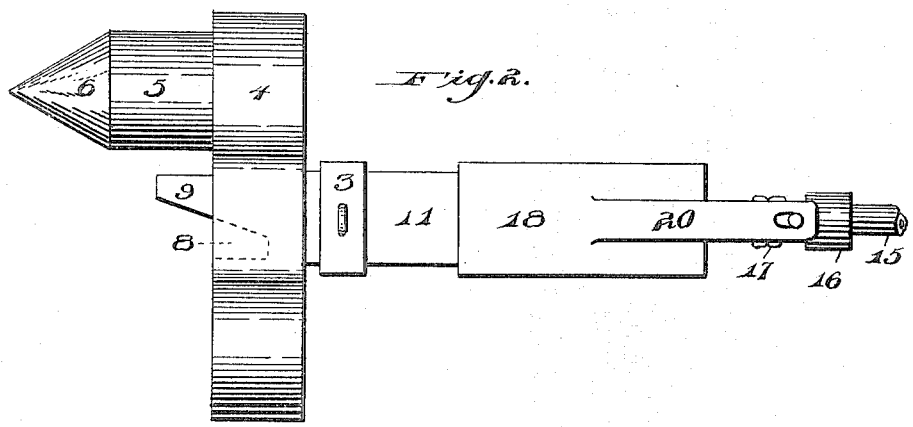
Fig. 2.
Fig. 3.
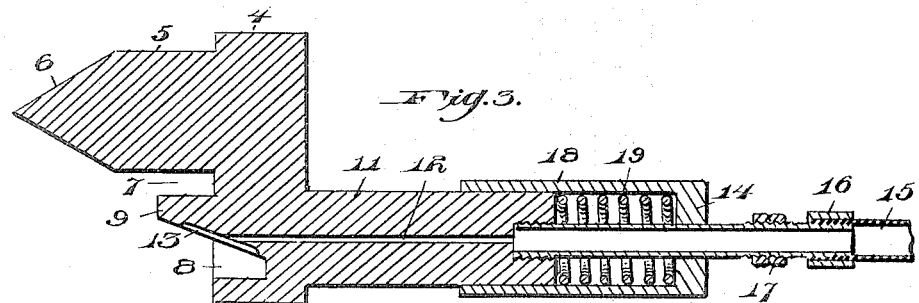
Fig. 7.
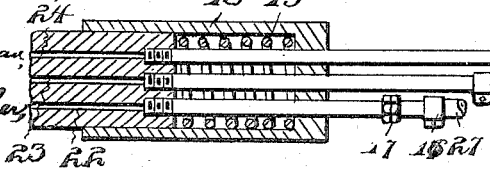
WITNESSES:
INVENTOR
G. J. Netter.
BY
ATTORNEYS.

No. 640,405. Patented Jan. 2, 1900.
G. J. NETTER.
AUTOMATIC COUPLING FOR AIR BRAKES.
(Application filed Nov. 6, 1899.)
(No Model.) 2 Sheets—Sheet 2.

WITNESSES:

INVENTOR
G. J. Netter.
BY
ATTORNEYS.

THE NORRIS PETERS CO., PHOTO-LITHO., WASHINGTON, D. C.

UNITED STATES PATENT OFFICE.

GEORGE J. NETTER, OF EAST PITTSBURG, PENNSYLVANIA.

AUTOMATIC COUPLING FOR AIR-BRAKES.

SPECIFICATION forming part of Letters Patent No. 640,405, dated January 2, 1900.

Application filed November 6, 1899. Serial No. 735,991. (No model.)

*To all whom it may concern:*

Be it known that I, GEORGE J. NETTER, a citizen of the United States of America, residing at East Pittsburg, in the county of Allegheny and State of Pennsylvania, have invented certain new and useful Improvements in Automatic Couplers for Air-Brakes, of which the following is a specification, reference being had therein to the accompanying drawings.

My invention relates to certain new and useful improvements in train-pipe connections and is particularly adapted for use for coupling train-pipes of air-brakes.

The object of my invention is to construct a train-pipe connection of this character which will automatically connect the train-pipe of each car when the same are coupled together.

A further object of my invention is to construct a device of this character with means for guiding the connection of each car together to prevent the non-connecting of the train-pipe when the cars are coupled.

Briefly described, my invention consists in providing the end sills or platform of a car with a coupling having one side formed with an outwardly-extending guide-arm with a cone-shaped end, the opposite side formed into a guide or coupling ring, the portion between the ring and guide-arm provided with an oblong and a triangular recess, forming a triangular-shaped projection arranged between each of the recesses, a recess arranged in the triangular recess, a tubular extension formed integral with the inner face of the connection or coupling and provided with an air-passage extending therethrough, a buffing-cylinder loosely mounted on the said tubular extension and having arranged therein a buffing-spring abutting against the end of the extension, a stop-arm formed integral with the buffing-cylinder and supported from the underneath face of the car, and a pipe connection between said tubular extension and the train-pipe.

My invention finally consists in the novel construction, combination, and arrangement of parts to be hereinafter more fully described, and specifically pointed out in the claims.

In describing the invention in detail reference is had to the accompanying drawings, forming a part of this specification and wherein like numerals of reference indicate corresponding parts throughout the several views, in which—

Figure 5:
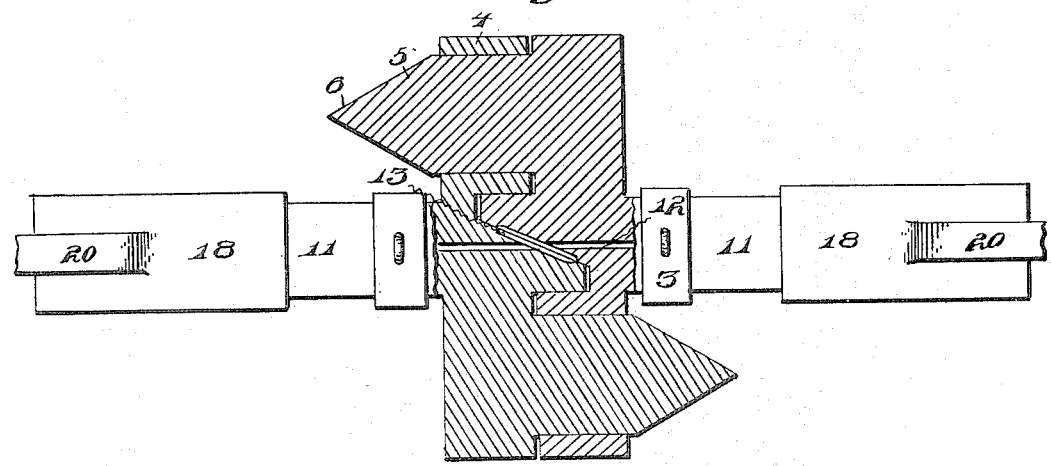
Figure 6:
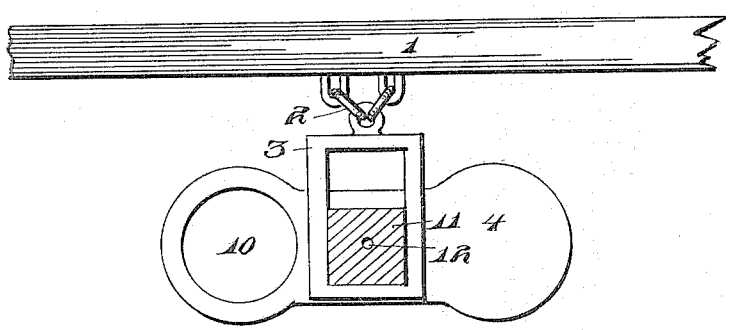

Figure 1 is a side elevation of my improved train-pipe connection as connected to the underneath face of a car. Fig. 2 is a top plan view of the train-pipe connection. Fig. 3 is a longitudinal sectional view thereof. Fig. 4 is an end view thereof. Fig. 5 is a top plan view, partly in longitudinal section, showing two of the connections in their coupled position. Fig. 6 is a rear view of the connection, partly in section. Fig. 7 is a vertical sectional view of a portion of the tubular extension and the connections, showing the arrangement of passages when it is desired to employ the same for connecting the heat, air, and signal pipes thereto.

Referring to the drawings by reference-numerals, 1 indicates the sill or platform of a car, to the underneath face of which is secured, by means of the links 2, the hanger 3 for supporting the connections.

My improved connection consists of a suitable casting 4, provided at one side with an outwardly-extending guide-arm 5, having its end substantially cone-shaped, as at 6. The outer face of this casting is provided with an oblong recess 7 and a triangular-shaped recess 8, forming between the same a wedge-shaped projection 9. The opposite end of the casting is formed with a guide or coupling ring 10 to receive the adjacent guide-arm of the opposite connection. Formed integral with the inner face of the said casting is an inwardly-extending tubular extension 11, having an air-passage 12 extending entirely therethrough and registering at its outer end with a recess 13, formed in the triangular-shaped recess 8.

One end of the tubular extension is formed with an annular recess which registers with one end of the air-passage 12, and within this annular recess is secured a pipe connection 14, to which is connected a train-pipe 15 by means of the annular collar 16.

17 indicates a pair of stop-nuts arranged on the pipe connection 14.

Loosely mounted upon one end of the tubular extension 11 is a buffing-cylinder 18, within which is arranged a buffing-spring 19, which projects against the outer face of the tubular extension 11. The end of the buffing-cylinder 18 is provided centrally with an opening to allow the pipe connection 14 to operate therethrough.

Formed integral with the upper face of the buffing-cylinder 18, near one end thereof, is a stop-arm 20, which is supported from the underneath face of the bottom of the car by a bracket 21. The end of the stop-arm 20 is provided with an elongated slot to allow of the lateral movement thereof. Of course it will be observed that the bracket 21, as well as the hanger 3, supports the train-pipe connection and that the links will permit a swinging motion thereof, while the hanger 3 a lateral motion thereof.

By forming the triangular-shaped recess with the recess 13 an elongated air-chamber is formed when the connections are brought together, as will be seen in Fig. 5 of the drawings. This allows for the connection, when they are brought together, with their air-passages to be out of alinement and yet accomplish the desired result and forming a connection without the loss of air while the connections are assuming their true position.

In Fig. 7 of the drawings I have shown a tubular extension with the passages 22, 23, and 24 for the connecting thereto of the heating-pipe 25, air-pipe 26, and signal-pipe 27. It will be evident that by the arrangement of the extension in this manner when the cars are brought together the cone-shaped or tapered end of the guide-arm will readily find its guide or coupling ring and draw the wedge-shaped projection 9 into the triangular recess to bring the air-passage 11 in alinement, so that an uninterrupted passage of the air, heat, and signal connections will be obtained. It will also be observed that this guide-arm projects entirely through the guide or coupling rings and that they are of such length that an instantaneous connection is obtained, as well as an automatic one. By providing the recess, as shown, in each of the couplings or connections it allows for the same to swing away from each other somewhat, yet forming the proper connection to permit the uninterrupted passage of air, and it will be observed that by the arrangement of the buffing-cylinder a lateral movement of the connections when the cars are coupled together will be cushioned and also arrested.

It is thought that the many advantages of my improved device will be readily apparent from the foregoing description, taken in connection with the accompanying drawings, and it will be noted that various changes may be made in the details of construction without departing from the general spirit of my invention.

Having thus fully described my invention, what I claim as new, and desire to secure by Letters Patent, is—

1. In a train-pipe connection for air-brakes, a casting or coupling formed at one side with an outwardly-extending guide-arm, a guide or coupling ring arranged to the opposite side of said casting or coupling, a tubular extension formed integral with said connection or coupling and provided with air-passages extending therethrough, a buffing-cylinder mounted on the said extension, a buffing-spring arranged in said cylinder and adapted to abut against the said extension, means for supporting said cylinder from the car, means for supporting said connection or coupling from the car, and means for connecting said extension to the train-pipe, substantially as set forth.

2. In a train-pipe connection for air-brakes, a connection or coupling formed with an outwardly-extending guide-arm having a tapered or conical portion formed at one side, a guide or coupling ring formed at the opposite side of said connection or coupling, the outer face of the said coupling provided with oblong and triangular shaped recesses, a projection formed between said recesses, a tubular extension formed integral with said connection or coupling and provided with an elongated air-passage opening at one end into the triangular-shaped recess, means for cushioning the lateral movement of the said connection or coupling, and means for supporting said cushion means, substantially as set forth.

3. In a train-pipe connection, the combination of a pair of couplings or connections provided at opposite sides with guide-arms, guide or coupling rings arranged at opposite sides of the coupling adapted to receive the said guide-arms, a tubular extension formed integral with said connections and couplings, said couplings provided with oblong and triangular shaped recesses, a projection formed integral with each coupling adapted to engage said triangular recess, an air-chamber formed on the said triangular recess when the couplings are brought together, said tubular extension formed with an elongated air-passage adapted to communicate with the said air-chamber, means for supporting said couplings from the car, and means for cushioning said connection or coupling, substantially as set forth.

4. In a train-pipe connection, the combination of a pair of couplings or connections provided at opposite sides with guide-arms, guide or coupling rings arranged at opposite sides of the coupling adapted to receive said guide-arms, a tubular extension formed integral with said connections or couplings, said couplings provided with oblong and triangular shaped recesses, a projection formed integral with each coupling adapted to engage the said triangular recess, an air-chamber formed in the said triangular recess when the couplings are brought together, said tubular extension formed with an elongated air-passage adapted to communicate with said air-chamber, a buffing-cylinder mounted on the end of said tubular extension, means arranged in said cylinder for cushioning the movement of the said couplings or connections, and means for supporting said tubular extension, substantially as set forth.

5. In a train-pipe connection, the combination of a pair of couplings or connections provided at opposite sides with guide-arms, guide or coupling rings arranged at opposite sides of the coupling adapted to receive said guide-arms, a tubular extension formed integral with said connections or couplings, said couplings provided with oblong and triangular shaped recesses, a projection formed integral with each coupling adapted to engage the said triangular recess, an air-chamber formed in the said triangular recess when the couplings are brought together, said tubular extension formed with an elongated air-passage adapted to communicate with said air-chamber, a buffing-cylinder mounted on the end of said tubular extension, means for supporting said buffing-cylinder, and means for limiting the movement of said cylinder, substantially as set forth.

6. In a train-pipe connection, the combination of a pair of couplings or connections provided at opposite sides with guide-arms, guide or coupling rings arranged at opposite sides of the coupling adapted to receive said guide-arms, a tubular extension formed integral with said connections or couplings, said couplings provided with oblong and triangular shaped recesses, a projection formed integral with each coupling adapted to engage the said triangular recess, an air-chamber formed in the said triangular recess when the couplings are brought together, said tubular extension formed with an elongated air-passage adapted to communicate with said air-chamber, a buffing-cylinder mounted on the end of said tubular extension, means for supporting said buffing-cylinder, and means for connecting the said extension and train-pipe, substantially as set forth.

In testimony whereof I affix my signature in the presence of two witnesses.

GEORGE J. NETTER.

Witnesses:
JOHN NOLAND,
WILLIAM E. MINOR.